United States Patent [19]

Barlow et al.

[11] 4,029,541

[45] June 14, 1977

[54] MAGNETIC RECORDING DISC OF IMPROVED DURABILITY HAVING TIN-NICKEL UNDERCOATING

[75] Inventors: Malcolm Barlow, Sunnyvale; Jerry R. Lundquist, San Jose, both of Calif.

[73] Assignee: Ampex Corporation, Redwood City, Calif.

[22] Filed: Feb. 19, 1976

[21] Appl. No.: 659,528

Related U.S. Application Data

[63] Continuation-in-part of Ser. No. 485,812, July 5, 1974, abandoned.

[52] U.S. Cl. .................. 427/130; 428/648; 156/150; 156/154; 156/319; 204/36; 204/37 R; 346/137; 360/135; 427/337; 427/405; 427/131; 427/383 C

[51] Int. Cl.$^2$ ...................... H01L 21/306

[58] Field of Search ............... 156/3, 5, 6, 18, 150, 156/151, 154, 319; 427/127–132, 305, 383, 328, 399, 337, 405, 355; 428/469, 900; 29/194, 197; 204/35 R, 37 R, 37 T, 38 B, 36; 148/31.5, 31.55, 6.14 R; 360/135; 346/137; 51/317

[56] References Cited

UNITED STATES PATENTS

| | | | |
|---|---|---|---|
| 3,321,328 | 5/1967 | Koretzky | 427/305 |
| 3,460,968 | 8/1969 | Bate et al. | 427/130 |
| 3,471,272 | 10/1969 | Wilhelm et al. | 427/132 |
| 3,674,554 | 7/1972 | Patel et al. | 148/6.14 R |
| 3,681,225 | 8/1972 | Genma et al. | 204/36 |
| 3,719,525 | 3/1973 | Patel et al. | 148/6.14 R |
| 3,767,369 | 10/1973 | Barlow et al. | 29/194 |
| 3,886,052 | 5/1975 | Smith | 204/37 R |

*Primary Examiner*—Charles E. Van Horn
*Assistant Examiner*—J. J. Gallagher

[57] ABSTRACT

A magnetic disc of improved durability is provided which has an undercoating of a relatively thick tin-nickel layer with a cobalt-containing magnetic layer over said tin-nickel layer and having an oxidized surface.

3 Claims, No Drawings

MAGNETIC RECORDING DISC OF IMPROVED DURABILITY HAVING TIN-NICKEL UNDERCOATING

REFERENCE TO RELATED APPLICATION

This application is a continuation-in-part of Ser. No. 485,812 filed July 5, 1974, now abandoned.

SUMMARY OF THE INVENTION

Plated cobalt-nickel-phosphorus and cobalt-phosphorus films are used in high density magnetic recording media such as discs and drums. In some such systems, a flying head is employed which normally flies with a clearance of about 100 microinches and makes contact with the medium only on start-up or stop; in other systems, the head comes in direct contact with the medium, and, even in those systems wherein the flying height of a head is nominally on the order of 10 microinches, the head may frequently contact the disc during operation due to instability of the system. In the past, many attempts have been made to provide discs capable of withstanding repeated contacts with the head. Some systems have employed a coating of a hard metal such as rhodium or a polymeric organic film over the magnetic surface. Other systems have been considered to be suitable only for those systems where the head flies at from 30 to 100 microinches and the head rarely contacts the surface of the disc outside the start/-stop mode of operation.

An important factor in the performance of any disc system is the need to provide firm supporting layers under the thin metal films to give them adequate durability and long life. In accordance with the present invention, discs are provided with a thick (150 microinches to 1 mil) layer of tin-nickel (or equally hard material) immediately under the magnetic film. As a result, significantly improved resistance to head impact is obtained, and such discs may be used in those systems wherein the head frequently comes into contact with the disc surface. Such discs combining various magnetic metal films and utilizing rhodium or duplex overcoatings as described for example in our previous U.S. Pat. No. 3,767,369, were proven successful in numerous mechanical and start/stop tests. Equally good results were obtained utilizing an oxide overcoating in place of the rhodium, but it should be noted that in such cases, unlike prior art, no lubricants are necessary for the success of the system. Previous attempts to employ oxide films have not been fully successful. For one thing, as is pointed out above, it has been considered that such films were only suitable for use with non-contact heads. Further, the techniques employed in the past have been complicated and difficult to control in commercial practice.

In accordance with the present invention, a disc or similar substrate is fabricated from a relatively light, soft, easily machineable metal, such as aluminum. The aluminum disc is coated with a layer of nickel about 1 mil thick from an electroless nickel bath and then polished. In a preferred embodiment of the invention, a layer of tin-nickel (65-35 by weight) about 150 microinches thick is then electrodeposited on top of the electroless nickel. The tin-nickel serves a two-fold purpose as it provides a hard and durable undercoat for the magnetic coating and it also acts as a magnetic spacer between the electroless nickel and the ultimate magnetic recording material. The hardness of the tin-nickel film is important as it allows the oxide disc to be used for contact recording. In addition, the substrate must be very hard to withstand a test of over 100,000 start/-stop cycles; this test is necessary to provide reliability in actual use. The spacer is important since subsequent processing of the disc (i.e., baking) causes some of the underlying electro-less nickel film to become magnetic as is explained later in detail. However, it must be emphasized that the hardness of the tin-nickel film is of utmost importance in obtaining a durable disc surface. Tin-nickel has a diamond pyramid hardness of 900 to 1,100, while electroless-nickel has a hardness of 500 to 600 dph (diamond pyramid hardness). Electroless-nickel films can be made harder by baking at elevated temperatures, but any increase in hardness is accompanied by increased magnetism. This film does not have the desired properties of the ultimate cobalt-nickel or cobalt film and, in close proximity to the magnetic film, would degrade the performance of the disc without the magnetic spacer. Furthermore, normal processing of the disc requires the electroless-nickel film to be extensively polished to remove pits and nodules that are common plating defects. This polishing operation causes a great deal of unevenness in the electroless-nickel film. It is possible that some areas of the disc may be covered with only 100 microinches of electro-less-nickel while other areas may have 1 mil or even more. Thin electroless-nickel films provide poor support for a head during start/stop cycles and for contact type recording. However, the deposition of 150 microinches or more of unpolished tin-nickel over electro-less-nickel provides a very hard layer on which to deposit the cobalt-nickel. This use of tin-nickel prevents catastrophic failures that are common when using only electroless-nickel. Normally in the tin-nickel layer is not polished since polishing may cause the layer to become too thin to be effective in some places. However, if the tin-nickel layer is very thick, e.g., about 1 mil, the layer may be polished. Typically, over the tin-nickel, a cobalt-nickel-phosphorus or cobalt-phosphorus film is electroplated to a thickness of from 3 to 30 microinches, and this is then etched in an aqueous bath consisting of a mildly acidic aqueous solution containing from 0.1 to 0.01 nitric acid or 0.01 to 1 percent ammonium persulfate. No chelating agent is used. This etching or oxidation causes a distant color change in the cobalt-nickel-phosphorus or cobalt-phosphorus layer; thereafter the disc is water rinsed and immersed in boiling water and allowed to air dry. The boiling water treatment can be omitted if desired. Thereafter the disc is baked at from 225° to 325° C. and preferably at 275° for ½ to 6 hours. Normally a baking time of about 1½ hours is considered optimum. The oxide film is then polished using ¼ micron diamond dust or alumina to remove any loose oxide and to provide a desirable running surface for the head.

DESCRIPTION OF THE PREFERRED EMBODIMENTS

Example 1

An aluminum alloy blank was diamond turned to provide a good surface finish and the disc was then activated and pretreated with a zincate solution and an electroless layer of nickel deposited thereon to a thickness of 1 mil and polished. A layer of tin-nickel 150 microinches thick was then electrodeposited on top of the electroless-nickel. This can be done as is taught in U.S. Pat. No. 3,767,369 although in the present instance the tin-nickel layer is deposited to a much greater depth. Over the unpolished tin-nickel, a cobalt-nickel-phosphorus film (85%, 14% and 1% respectively by weight) was electroplated to a thickness of about 15 microinches. This was then etched in a 0.02 percent nitric acid bath at room temperature for about 4 minutes. This was then water washed and immersed in boiling water for 1 minute and air dried. The disc was then baked at a temperature of 275° C for 1½ hours in air and then polished utilizing ¼ micron diamond dust. To test the durability of the SnNi layer and the oxide film, a ferrite recording head was placed on the disc at a radius of 5 inches and a start/stop cycle was begun wherein the disc speed varied from 0 to 1800 RPM. The start/stop cycle was repeated 100,000 times on a single track without failure. The nominal flying height of this recording head was 40 microinches although it was in contact with the disc at the beginning and end of each start/stop cycle. No loss of signal amplitude was noticeable after the test, and only a slight burnishing of the disc was detected by optical observation. Based on experience with previous discs, it is reasonable to expect in excess of 250,000 start/stop tests before disc failure might occur. In contrast, a similar cobalt-nickel film which did not have the tin-nickel underlayer would fail after 1,000 to 10,000 start/stop cycles.

Example 2:

An aluminum blank was prepared as described in Example 1, complete with electroless-nickel, tin-nickel, cobalt-nickel-phosphorus and the oxide film. In commercial practice, this type of disc was found to be fully acceptable. When the tin-nickel was deleted and a special thin non-magnetic electroless-nickel was the only supporting layer, the discs failed rapidly even when used in the normal manner. The mechanism for this type of failure is best explained by the deformation of the soft aluminum and the electroless-nickel underlayer. In the above test, the special nonmagnetic electroless-nickel would not affect the durability of discs, provided that a tin-nickel sublayer was interposed. Here again the hardness of the tin-nickel is the overriding factor.

Example 3:

An aluminum blank was prepared as described in Example 1, complete with electroless-nickel. Approximately 1 mil of tin-nickel was electrodeposited over the electroless-nickel and polished. Then 8 microinches of cobalt-nickel-phosphorus was deposited over the tin-nickel and etched utilizing a bath containing 0.03 percent ammonium persulfate. The disc was baked and polished as before. It is common for this type of disc to last 2,000 hours in continuous use but by deleting the 1 mil tin-nickel sublayer, failures are common after 200 hours of continuous recording. Again, the softness of the underlayers are responsible for the premature failures.

The oxide surface of the present invention, particularly when combined with the hard tin-nickel undercoat, produces a disc which is rugged and one which can be used regardless of the flying height of the head. The disc of the present invention can be substituted for rhodium discs even when the head comes in direct contact with the disc. In the past, it was thought that oxide-coated discs could only be used in systems where the head flies at 30 to 100 microinches and the head rarely hits the surface of the disc outside the start/stop mode of operation. The films of the present invention can be used even in contact recordings wherein the run out greatly exceeds normal commercial practice. For instance, most systems using contact recording require a disc that has less than 2 mils total indicated run out, and the life would be reduced if the run out exceeds this amount. However, by using a SnNi undercoat described in the present invention, 1,000 hours of useable recording time have been recorded with a total indicated run out of 4 mils which is far beyond recommended practice. A life of 200 hours is considered good.

Another advantage of the present invention is that it yields excellent electrical and magnet performance. For example, oxide coated discs made in accordance with the present invention can be used in high performance digital and video systems where the signal frequency can be as high as 10 MHz. The output, resolution and signal-to-noise ratios are acceptable even when the recording wavelength is 100 microinches. Because of the spacing loss, the oxide film must be kept thin, and thicknesses of from 0.5 to 10 microinches can be used, although 2–4 microinches is about optimum.

The CoNi films adhere well to the SnNi layer and the oxide coating resists shedding and provides a low coefficient of friction. The oxide films do not need any lubricant for excellent performance and the addition of organic or inorganic lubricants is actually detrimental since substantial amounts of lubricants can be built up between the discs and head, causing premature failure.

We claim:
1. The process of making a magnetic recording medium comprising the following steps:
   a. providing a metallic, non-magnetic substrate,
   b. forming an electroless-nickel coating on said substrate,
   c. polishing said electroless-nickel coating,
   d. forming a tin-nickel layer over said electroless-nickel having a thickness of from 150 microinches to 1 mil.
   e. forming a magnetic film selected from cobalt-nickel-phosphorus and cobalt-phosphorus over said tin-nickel film,
   f. etching the surface of said film to produce a color change on said surface with an aqueous solution of a mild oxidizing agent selected from an aqueous nitric acid solution having a strength of 0.1 to 0.01 percent and an aqueous solution of ammonium persulfate having a strength of 0.01 to 1 percent, in the absence of a chelating agent, and
   g. baking the composite structure at a temperature of from 225° to 325° C. for a time of from ½ to 6 hours.

2. The process of claim 1, wherein the tin-nickel layer is not polished prior to the formation of the magnetic film.

3. The process of claim 1 wherein the composite structure is polished with diamond dust or alumina.

* * * * *